Patented Jan. 8, 1929.

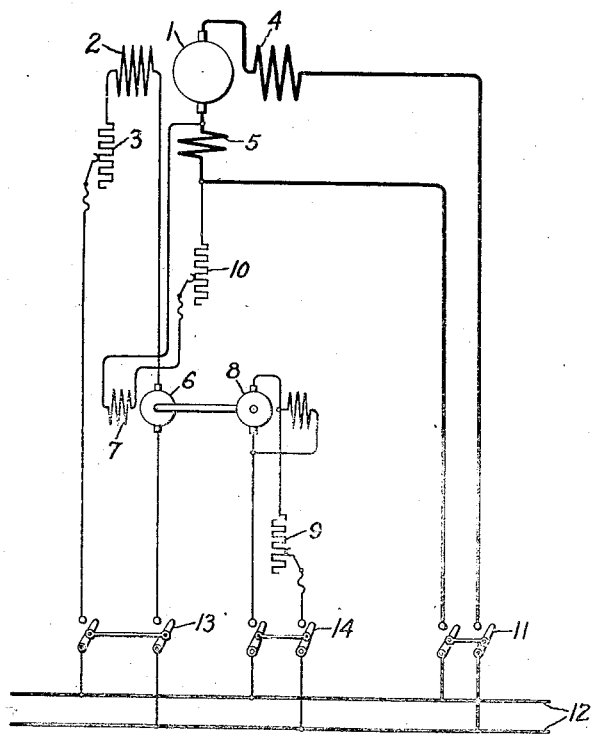

1,698,288

UNITED STATES PATENT OFFICE.

HARRY A. WINNE, OF SCHENECTADY, NEW YORK, ASSIGNOR TO GENERAL ELECTRIC COMPANY, A CORPORATION OF NEW YORK.

MOTOR-CONTROL SYSTEM.

Application filed January 5, 1927. Serial No. 159,069.

My invention relates to systems of motor control and particularly to the regulation of adjustable speed motors.

An object of my invention is to provide an improved arrangement whereby the speed regulation of an adjustable speed motor may be automatically maintained as small as possible at all operating speeds, or whereby the percentage speed change from no load to full load for different operating speeds may be automatically maintained substantially the same.

The usual direct-current constant-voltage motor which has a considerable range of operating speed by means of shunt field control will have a different speed regulation at full field speed than it has at weak field speed. That is, the drop in speed from no load to full load will be different at different operating speeds. With the usual adjustments of brush position and interpole and compensating field strengths the percentage drop at full field speed will ordinarily be higher than at weak field speed.

By properly shifting the brushes of the motor, the speed regulation can usually be made zero at any one operating speed but will have some other value at every other operating speed. For many applications it is desirable to keep the speed regulation of an adjustable speed motor as small as possible at all operating speeds. In other applications it is desirable to maintain the same percentage drop in speed from no load to full load at all operating speeds.

In carrying my invention into effect, I introduce a source of voltage, which may be an auxiliary generator or exciter driven at substantially constant speed, in series with the shunt field winding of a compound wound motor to provide a voltage in opposition to the normal energizing voltage of the shunt field circuit. This source of voltage is arranged to vary the voltage applied to the shunt field circuit of the motor in accordance with variations in load current but independently of the motor speed. By properly proportioning the series field excitation and the voltage of the source of voltage, a combination may be obtained which will give approximately the desired speed regulation at all speeds within the normal operating range of the motor.

My invention will be better understood by reference to the following description when taken in connection with the accompanying drawing in which the single figure diagrammatically illustrates a system of motor control embodying the invention for the purpose of explaining the principles thereof.

Referring to the drawing, the system shown comprises an adjustable speed direct current motor 1 having a shunt field winding 2 with an adjustable rheostat 3 in circuit for varying the motor speed. The motor is also equipped with a series field winding 4 which is wound accumulatively with respect to the shunt field winding 2; that is, so that the ampere turns of the series field, when the motor is running in the normal direction, assist the ampere turns on the shunt field winding in maintaining the field flux. The motor is also provided with a commutating field winding 5. The source of voltage introduced in series with the shunt field winding is shown as a direct current generator or exciter 6 having a field winding 7. This exciter is arranged to be driven at approximately constant speed by means of a suitable constant speed device shown as an electric motor 8 of the direct current type. A rheostat 9 is connected in series with the armature circuit of motor 8 to represent diagrammatically a means for adjusting the speed of the constant speed device. The field winding 7 of the exciter is connected across the terminals of the commutating field winding 5 so that the field winding 7 is excited by a current which is proportional to the load current of the main motor 1. While I prefer to connect the field winding 7 across the commutating field winding, various arrangements to obtain the desired excitation, such as connecting the exciter field winding across the series field or across a resistor in series with the armature circuit, will occur to those skilled in the art, and may be used without departing from my invention in its broader aspects. An adjustable rheostat 10 is connected in circuit with the field winding 7 to afford a means for adjusting the effect of exciter 6. The armature of exciter 6 is connected in series with the shunt field winding 2 of the main motor in such a way that when current is flowing in the normal direction in the armature of the main motor, and consequently through the field 7 of the exciter, the exciter voltage will be in opposition to the voltage of the main shunt field; that is, it will tend to reduce the voltage actually applied to the motor field, and, consequently, reduce the shunt field current.

The main motor 1 may be connected through a starting and accelerating device (not shown) examples of which are well known in the art, but for simplicity of illustration the main armature terminals are shown as connected through a suitable switch 11 to a direct current supply circuit 12. In like manner the shunt field winding 2 is connected to be energized in accordance with the voltage applied to the armature of the main motor and is connected across the supply circuit 12 through a suitable switch 13. The motor 8 may be energized from any convenient source, and as shown is arranged to be energized from the supply circuit 12 through a suitable switch 14.

For purposes of illustrating how the excitation of the various field circuits may be proportioned to obtain the desired regulation, the following example will be considered in which certain assigned values are taken by way of example.

Assume that a direct current motor is to be arranged to operate over a range of speed from the basic or full field speed to twice this value by shunt field control. That is, if the basic speed is considered as 100%, the top speed will be 200%. The no-load field current at basic speed will be 100% and the no-load field current at top speed might reasonably be 40%. Now assume that it is found that in order to hold the full-load speed at the no-load basic value, it is necessary to reduce the field current to 92%, and in order to hold the full-load speed at the top value it is necessary to reduce the field current to 39%. If the number of ampere turns on the shunt field is considered as 100%, then in order to get zero speed regulation at the basic speed, the ampere turns at full-load should be 92%, and at top speed the ampere turns at full-load should be 39%. Since the no-load field current at basic speed is 100% and the field is excited from a constant voltage bus, it may be said that the total resistance of the field circuit, including the field rheostat, is, under this condition, 100%. At the top speed the no-load field current is 40% so that on the same basis the total resistance under this condition would be 250%. The voltage of the excitation bus is assumed constant at 100%.

Now consider the function of the accumulative series field and series exciter in the excitation circuit. Let $x$ equal the voltage of the exciter armature, when full-load field current is flowing through the armature of the main motor, keeping in mind that this exciter voltage opposes the excitation bus voltage. Let $y$ equal the number of ampere turns due to the main series field on the main motor at full-load, keeping in mind that these turns assist the ampere turns due to the shunt field. Then with the field rheostat set for basic speed no-load, that is, with a total field circuit resistance of 100% the shunt field current at full load will be $$\frac{100-x}{100}$$

and the shunt field ampere turns $$\left(\frac{100-x}{100}\right)x100.$$

The total ampere turns including those due to the accumulative series field will be $$\left(\frac{100-x}{100}\right)x100+y.$$

And since for zero speed regulation it is necessary that the total number of ampere turns at full load equal 92%, the equation for the total ampere turns may be written as follows:

$$\left(\frac{100-x}{100}\right)x100+y=92 \quad (1)$$

Similarly, with the field rheostat set for top speed at no load the following condition at full load is desired:

$$\left(\frac{100-x}{250}\right)x100+y=39 \quad (2)$$

Now, solving equations (1) and (2) for $x$ and $y$, it is found that $y$ equals 3.67% and $x$ equals 11.67%. In other words, if the series field winding 4 is arranged so that the ampere turns at full load are equal to 3.67% of the full shunt ampere turns and exciter 6 is designed and rheostat 10 adjusted so that the differential voltage across the exciter armature with full load current on the main motor is 11.67% of the excitation bus voltage, zero per cent speed regulation is obtained on the main motor from no load to full load at both basic and top speeds. At points intermediate the basic and top speeds the regulation may not be quite zero per cent, owing to the fact that the saturation curve of the main motor will not be a straight line, but the speed regulation at any point will be very small. By suitably proportioning rheostat 10 and operating rheostats 3 and 10 jointly, zero speed regulation may be obtained at the operating speeds between basic and top speeds.

It will be obvious that by proportioning the excitation of the series field and voltage of the exciter similarly to the example given for zero speed regulation, any desired speed regulation may be obtained so as to have the same percentage drop or a predetermined ratio between percentage drops from no load to full load at all operating speeds.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. The combination with an electric motor having series and shunt field windings, of means connected in series relation with said shunt field winding for introducing a voltage having a magnitude independent of the speed of the said motor in opposition to the normal energizing voltage of said field winding, and means for varying the voltage of said source of voltage in accordance with the load current of said motor.

2. In combination with an electric motor having shunt and series field windings, of an auxiliary generator connected in series relation with said shunt field winding for introducing a voltage in opposition to the normal energizing voltage of said shunt field winding, means for driving said auxiliary generator at a substantially constant speed, and means for varying the voltage of said auxiliary generator in accordance with the value of the load current of said motor.

3. In combination with a compound wound electric motor having a shunt and a series field winding, of an auxiliary generator connected in series relation with said shunt field winding for introducing a voltage in opposition to the normal energizing voltage of said shunt field winding, means comprising an electric motor for driving said auxiliary generator at substantially constant speed, and means for varying the excitation of said auxiliary generator in proportion to the variations in the load current of said motor.

4. In combination with an adjustable speed motor having shunt and series field windings, of an auxiliary generator having a voltage independent of the speed of said motor for varying the excitation of said shunt field winding, and means for varying the voltage of said auxiliary generator in accordance with variations in the magnitude of the load current of said motor.

5. In combination with an adjustable speed direct current motor having a series and a shunt field winding, of an auxiliary generator connected in series relation with said shunt field winding for varying the relative excitations of said series and shunt windings in accordance with the load current and independently of the speed of said motor, and means for adjusting the total resistance of said shunt field winding and the voltage of said auxiliary generator for predetermining the speed regulation of said motor throughout its range of operating speeds.

6. In combination with an adjustable speed direct current motor having a series and a shunt field winding, of an auxiliary generator connected in series relation with said shunt field winding for varying the relative excitation of said series and shunt windings in accordance with the load current and independently of the speed of said motor, and means for predetermining the total resistance of said shunt field winding and the voltage of said auxiliary generator for maintaining substantially zero speed regulation of said motor throughout its range of operating speeds.

In witness whereof, I have hereunto set my hand this 3d day of January, 1927.

HARRY A. WINNE.